United States Patent [19]

Panster et al.

[11] Patent Number: 4,954,599

[45] Date of Patent: Sep. 4, 1990

[54] FORMED, POLYMERIC, TERTIARY OR SECONDARY ORGANOSILOXANE AMINE COMPOUNDS, METHODS OF THEIR PREPARATION AND USE

[75] Inventors: Peter Panster, Rodenback; Peter Kleinschmit, Hanau, both of Fed. Rep. of Germany

[73] Assignee: DEgussa Aktiengesellschaft, Frankfurt am Main, Fed. Rep. of Germany

[21] Appl. No.: 295,886

[22] Filed: Jan. 11, 1989

[30] Foreign Application Priority Data

Jan. 12, 1988 [DE] Fed. Rep. of Germany ....... 3800563

[51] Int. Cl.$^5$ .............................................. C08G 77/26
[52] U.S. Cl. ........................................ 528/38; 528/39; 556/413
[58] Field of Search ...................... 528/38, 39; 556/413

[56] References Cited

U.S. PATENT DOCUMENTS 4,455,415 6/1984 Panster et al. ..................... 528/30

Primary Examiner—Melvyn I. Marquis
Attorney, Agent, or Firm—Beveridge, DeGrandi & Weilacher

[57] ABSTRACT

Spherical, polymeric, tertiary or secondary organosiloxane amine compounds comprising:

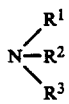

(I)

units in which $R^1$ and $R^2$ stand for a group:

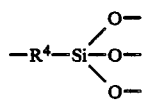

(II)

$R^4$ is an alkylene grouping and the oxygen atoms are saturated by silicon atoms of other groups (II), with the optional inclusion of cross-linking agents, $R^3$ is equal to $R^1$ and $R^2$ or stands for hydrogen, an alkyl, cycloalkyl or the benzyl group. Also disclosed is a method for the preparation of the compounds in spherical form and the use of these products for removing acids from liquids and gases as well as for the adsorption of gaseous organic compounds.

21 Claims, No Drawings

FORMED, POLYMERIC, TERTIARY OR SECONDARY ORGANOSILOXANE AMINE COMPOUNDS, METHODS OF THEIR PREPARATION AND USE

INTRODUCTION AND BACKGROUND

The subject matter of the present invention relates to formed, polymeric, tertiary or secondary organosiloxane amine compounds which exhibit the advantages of spherical form when employed in the areas of processing and application technology when compared to previously known polymeric organosiloxane amine compounds. In a further aspect, the present invention relates to methods according to which the new spherically shaped polymers can be prepared not only in the particular spherical geometric shape which is ideal for the particular industrial applications but also with suitable physical properties. Further, the subject matter of the present invention relates to the use of the shaped solid organosiloxane amine compounds.

DE-PS 31 20 214 describes insoluble, polymeric, optionally cross-linked, tertiary or secondary organosiloxane amines which can be used for such purposes as weakly basic ion exchangers, as adsorbents, as carriers for active substances, as carriers of heterogenized, homogeneous catalysts or as heterogeneous bases in base-catalyzed reactions. These polymeric substances exhibit, in comparison to polymeric amines with a purely organic basis such as those described e.g. in EP-PS 0 014 255 a higher mechanical, thermal and chemical stability. Moreover, their physical qualities are considerably more independent of external influences such as pressure and temperature as well as liquid and gaseous media. In comparison to heterogeneous amine bases like those obtainable by means of the functionalization of inorganic polymer carriers such as silica with amino alkyl (alkoxy) silanes (GB 1,506,226), the polymeric organosiloxane amine compounds exhibit in particular a considerably higher amine capacity. The matrix of these products can be prepared in a "cut to measure" fashion, e.g. in relation to the aspect, important for use as catalyst carrier, that the amine density can be controlled by the inclusion of cross-linking agents containing silicon, titanium, zirconium and aluminum.

Thus, products are involved, on the whole, which can be modified chemically in an ideal manner so as to be adapted to the multiple uses previously described. From the standpoint of application of this technology, however, they seem to need improvement since they could previously only be obtained in lumpy or powder form and not in the spherical form which is required and more advantages for many areas of application. Typical areas of application in which the spherical form is considered to be a prerequisite for large-scale applications are, for instance, the use as catalyst, catalyst carrier, ion exchanger or adsorbent. It should not be overlooked that even the material in spherical form must exhibit the physical qualities required for the particular application, such as a certain porosity or a certain specific surface area, if an optimum action is to be achieved.

SUMMARY OF THE INVENTION

The present invention therefore has the object of creating insoluble, polymeric organosiloxane amine compounds of the type described in DE-PS 31 20 214 corresponding to U.S. Pat. No. 4,455,415, in solid spherical form with the desired physical qualities. This object is achieved by the invention by means of formed, polymeric, optionally cross-linked, tertiary or secondary organosiloxane amine compounds shaped in macroscopic spherical particles with a diameter of 0.01 to 3.0 mm, a specified surface area of 0 to 1000 m²/g, a specific pore volume of 0 to 6.0 ml/g and a bulk density of 50 to 1000 g/l. In particular, the specific surface area is at least 0.1 m²/g and the specific pore volume is 0.01 to 6.0 ml/g. It is significant thereby that, above and beyond the disclosure of DE-PS 31 20 214, the novel polymer substances of this invention can also contain different cross-linking agents.

Described in further detail, the formed, polymeric, optionally cross-linked, tertiary or secondary organosiloxane amine compounds of the present invention comprise units of the formula:

in which $R^1$ and $R^2$ are identical or different and represent a group of the formula:

in which formulae the nitrogen atoms in (I) are connected to the silicon atoms in (II) via the $R^4$ groups and $R^4$ represents an alkylene group with 1 to 10 C-atoms, a cycloalkylene group with 5 to 8 C atoms or a unit of the formula:

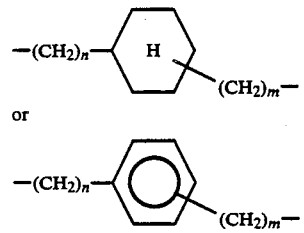

in which n is a number from 1 to 6 and indicates the number of methylene groups in nitrogen position
and m is a number from 0 to 6
and the free valences of the oxygen atoms bound to the silicon atom are saturated as in silica skeletons by:
(a) silicon atoms of other groups of formula (II) or
(b) with the metal atoms of one or more of the cross-linking binding links:

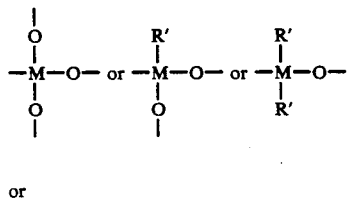

or

-continued

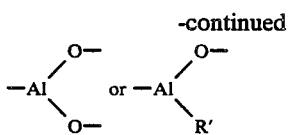

or a combination of (a) and (b)

in which M is a silicon, titanium or zirconium atom and R' a linear or branched alkyl group with 1 to 5 C atoms and the ratio of the silicon atoms of the groups of formula (II) to the metal atoms in the binding links is 1:0 to 1:10 and in which $R^3$ is equal to $R^1$ or $R^2$ or is hydrogen, a linear or branched alkyl group of 1 to 10 C atoms, a cycloalkyl group of 5 to 8 C atoms or the benzyl group.

The polymer of the present invention is featured by being in the form of macroscopically spherical particles with a diameter of 0.01 to 3.0 mm, a specific surface area of 0 to 1000 $m^2/g$, a specific pore volume of 0 to 6.0 ml/g as well as by a bulk density of 50 to 1000 g/l and in particular with a specific surface area of at least 0.1 $m^2/g$ and a specific pore volume of at least 0.01 ml/g.

The monomeric precursors of the formed polymer products of the invention are basically known compounds, e.g. of the formulae:

$HN[CH_2CH_2CH_2Si(OCH_3)_3]_2$ $N[CH_2CH_2CH_2Si(OC_2H_5)_3]_3$ and $(H_3C)N[CH_2Si(OC_2H_5)_3]_2.$ The composition of the polymer units obtainable therefrom can be described here by the formulae:

$HN[CH_2CH_2CH_2SiO_{3/2}]_2$ $N[CH_2CH_2CH_2SiO_{3/2}]_3$ and $(H_3C)N[CH_2SiO_{3/2}]_2.$ Particular advantages regarding the availability of the initial materials and the physical properties of the polymer are achieved with amines which consist of:

$N[CH_2CH_2CH_2SiO_{3/2}]_3$ or $HN[CH_2CH_2CH_2SiO_{3/2}]_2$

Particularly important subject matter of the present invention resides in the method for preparing the formed, polymeric organopolysiloxane amine compounds of the invention. The method is characterized by dissolving a secondary or a tertiary aminoorganosilane of the formula:

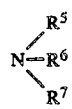 (III)

in which $R^5$ and $R^6$ are identical or different and represent a group of the formula:

$-R^4-Si(OR^8)_3$ (IV)

$R^4$ has the same meaning as in formula (II), $R^8$ is a linear or branched alkyl group with 1 to 5 C atoms and $R^7$ is equal to $R^5$ and $R^6$ or hydrogen, a linear or branched alkyl group with 1 to 10 C atoms, a cycloalkyl group consisting of 5 to 8 C atoms or benzyl group, in a conventional solvent.

Optionally, the dissolution is carried out after the addition of one or more cross-linking agents of the formula:

$M(OR')_{2-4}R'_{0-2}$ or $Al(OR')_{2-3}R'_{0-1}$ in which M is a silicon, titanium or zirconium atom, R' a linear or branched alkyl group with 1 to 5 C atoms and the ratio of silicon atoms of the groups of the general formula (IV) to the metal atoms in the cross-linking agents is 1:0 to 1:10.

A customary solvent can be used which is miscible to a great extent in water but dissolves aminoorganosilane and cross-linking agents. An amount of water which is sufficient at least for the complete hydrolysis and condensation is added to the solution under agitation, and the reaction mixture obtained thereby is allowed to gel under further agitation at a determined temperature in a range from room temperature to 200° C. The reaction conditions are such that the reaction mixture is compounded at the start of gelation or up to one hour thereafter with 10 to 2000 % by weight, preferably 50 to 500 % by weight, in relation to the total amount of aminoorganosilane (III) and optionally of cross-linking agents, with a conventional solvent which is non-soluble in water to a great extent but which dissolves the reaction mixture which has gelled (or started to gel) and is homogenized.

Then water is added to the viscous homogenizate immediately or over a period of time up to one hour, with optional elevation of the temperature originally set in an amount of 10 to 2000 % by weight, preferably 50 to 1000 % by weight, in relation to the total amount of aminoorganosilane and optional cross-linking agents.

The organic phase, which now contains siloxane, is dispersed in the liquid two-phase system and the solid which forms in the form of spheres is separated from the liquid phase after a reaction time sufficient therefor at room temperature to 200° C. It is then optionally extracted, dried at room temperature to 250° C., optionally under protective gas or in a vacuum, and is tempered 1 to 100 hours at temperatures from 150° to 300° C. and/or classified.

Generally, instead of the alkoxysilylamine compounds, the corresponding halide or phenoxy compounds can also be used as initial materials for the method. However, their use offers no advantages but rather can cause problems, e.g. in the case of the chlorides, due to the hydrochloric acid released during the hydrolysis.

The hydrolysis of initial material and optional cross-linking agent must be carried out in a solvent which is largely water-miscible but dissolves the initial materials. Alcohols are preferably used to this end which correspond to the alkoxy groupings on the monomeric precursors of the initial materials and to the alkoxy groups attached to the metal atoms of any cross-linking agents that may optionally be used. Methanol, ethanol, n- and i-propanol, n- and i-butanol or n-pentanol are especially suitable. Mixtures of such alcohols can also be used as solvent in the hydrolysis. Instead of alcohols, other polar solvents which are largely water-miscible can also be used. However, this is not preferable because of processing reasons on account of the solvent mixtures which form with the alcohol that is hydrolytically split off in the reaction.

The hydrolysis reaction is preferably performed with an excess of water over the stoichiometrically required amount. The amount of water required for hydrolysis depends on the hydrolysis speed of the particular aminoorganosilane or of the cross-linking agent used in such a manner that as the amount of water increases, a more rapid hydrolysis takes place. However, an upper limit can also be determined by separation which occurs in the reaction and by the formation of a two-phase system. Generally, a hydrolysis in homogeneous solution is preferable. Due to these two aspects mentioned, somewhat less water is used on the basis of weight in practice than the combined weight of aminoorganosilane plus cross-linking agent.

The duration of hydrolysis is a function of the tendency to hydrolysis of the initial material and/or of the cross-linking agent and of the temperature. The readiness for hydrolysis and therewith the hydrolysis speed are a function in particular of the type of alkoxy groups attached to the silicon, titanium, zirconium and aluminum. The methoxy group hydrolyzes most rapidly and a retardation takes place as the chain length of the hydrocarbon group increases. In addition, the time for the total hydrolysis and polycondensation process is a function of the basicity of the aminoorganosilane. As is known, amines function as condensation accelerators by bringing about an autocatalysis. Hydrolysis and polycondensation can therefore be accelerated by the addition of bases such as ammonia but also by addition of customary condensation catalysts such as dibutyl tin diacetate.

The requirement of maintaining the initial material, dissolved in solvent and compounded with water, at a certain temperature under further agitation results from the fact that the speed of the polycondensation, which is indicated by gelation, is temperature-dependent. The temperature to be used in the hydrolysis or gelation phase is empirically determined in the individual instance and is usually maintained constant after being set. Care must be taken thereby that a jelly-like mass which is free of solid matter and permeated by liquid remains preserved for the following, next method step, the so-called forming phase.

The forming phase, which accompanies the conversion of the coherent, jelly-like mass permeated by liquid (in which the condensation reaction progresses further) into separate, spherical particles, begins with the compounding of the reaction mixture, which has gelled (or started to gel), with a solvent which is largely non-water-soluble but sufficiently dissolves the reaction mixture in the provided amount.

Suitable solvents for the compounding or particle forming phase are e.g. linear or branched alcohols with 4 to 18 C atoms or phenols, linear or branched symmetric or asymmetric dialkylethers as well as di or triethers (such as ethylene glycol dimethylether), chlorinated or fluorinated hydrocarbons, aromatics [aromatic hydrocarbons]or aromatic mixtures substituted with one or more allyl groups such as. e.g. toluene or xylene, symmetric and asymmetric ketones which are largely not miscible with water.

Preferably, however, a linear or branched alcohol with 4 to 12 C atoms, toluene or o-, m- , p-xylene is added individually or in a mixture to the reaction mixture thereof which has gelled (or started to gel).

This addition of solvent brings about a dilution after homogenization with the reaction mixture and therewith a distinct retardation of the condensation reaction, which accompanies an increase in viscosity.

The measuring of the amount of this solvent used in the particle forming phase depends in particular on which particle size is desired for the particular formed organosiloxane amine compound. The following can be used as a rule of thumb: For coarse particle ( =spheres of a rather large diameter) a small amount and for fine particle (spheres with a rather small diameter) a large amount of solvent is to be used.

Moreover, the intensity with which the viscous homogenizate of reaction mixture and largely non-watersoluble solvent is dispersed in the additional water added in the forming phase as dispersion agent also influences the particle size. Generally, vigorous agitation favors the formation of a finer particle size. In order to stabilize the aqueous dispersion of the organic phase (which now contains siloxane), one of the known dispersing agents such as long-chain carboxylic acids or their salts or polyalkylene glycols can be used in customary concentrations.

According to a variant of the method of the invention a part or, alternatively, also the entire amount of the largely non-water-soluble solvent to be added during or after the start of gelling can be added as early as in the hydrolysis stage along with the solvent used there. In the case of a partial addition, the remainder is added after the start of gelling. In the extreme case of the addition of the entire amount, the dispersion agent can be added to water during or after the start of gelling. This variant is used with preference if the aminoorganosilane used exhibits an extraordinarily high tendency to hydrolysis and polycondensation.

The preferred temperature at which the dispersing of the organic phase containing siloxane in the aqueous phase is performed and spherical solid matter is formed from the disperse phase is as a rule the reflux temperature of the entire mixture. Basically, however, the same temperatures can be used as in the gelling stage. The total time of dispersion stage and subsequent, or post, reaction is generally 0.5 to 5 hours.

Both the gelling and the forming as well can be carried out at normal pressure or at a superpressure corresponding to the sum of the partial pressures of the components of the reaction mixture at the particular temperature used.

In the preparation of cross-linked organopolysiloxane amines which is also a function of the type of the alkoxy groups, the situation can arise that the aminoorganosilane exhibits a different hydrolysis and polycondensation behavior from the cross-linking agent. In this instance, an embodiment of the method of the invention provides that the cross-linking agent not be subjected together with the aminoorganosilane to gelation but rather that the aminoorganosilane be gelled first separately, homogenized with the largely non-water-soluble solvent and only then is the cross-linking agent or mixture thereof added to the homogenizate.

It is also possible to add the solvent and the cross-linking agent simultaneously to the gelled aminoorganosilane, in which instance homogenization, the addition of water and dispersion follow.

Another variant for preparing cross-linked organopolysiloxane amines provides that the aminoorganosilane and the cross-linking agent or agents are first precondensed in order to compensate for a differing hydrolysis and polycondensation behavior. To this end, the amino organosilane and the cross-linking agent or agents are precondensed over a period of 5 minutes to 24 hours at room temperature to 200° C. with or without the usage of an alcohol corresponding to the alkoxy groups, in the presence of an amount of water which is not sufficient for complete hydrolysis but rather preferably 1 to 30 mole % of the amount required therefor. In order to favor this precondensation effect, a further condensation catalyst of the type mentioned above can be added in addition to the aminoorganosilane present. Ammonia is used in this instance with preference. After the precondensation has taken place, the complete hydrolysis and polycondensation are carried out as described.

The separation of the spherically formed, moist product from the liquid dispersing agent can take place by means of customary measures such as decanting, filtering or centrifuging. It is also possible to remove the liquid phase from the reactor, treat the solid matter remaining therein once or repeatedly with a low-boiling extraction agent, preferably a low-boiling alcohol, in order to facilitate the later drying of the formed material by an at least partial replacement of the usually relatively high-boiling solvent of the forming phase by the low-boiling extraction agent.

The drying can generally be carried out at room temperature up to 250° C., optionally under protective gas or in a vacuum. The dried, formed solid can be tempered at temperatures of 150° to 300° C. for hardening and stabilization.

The dried/tempered product can be classified in conventional devices into different particle size fractions. Depending on the circumstances, the one or the other of the work-up measures of extraction, drying, tempering and classification can be eliminated. A classification can be carried out on a product which is moist with liquid, dried or tempered.

An especially important embodiment of the method of the invention provides that spherical material which is still moist or wet with solvent and water be subjected to a temperature treatment for 1 hour to one week at temperatures of 50° to 300° C., preferably 100° to 200° C., using a superpressure if needed.

This treatment under "steaming" or digesting conditions likewise serves primarily to improve the mechanical strength and the porosity of the formed material and can also be carried out in the last dispersion step of the preparation process containing the solid product phase or in water alone.

Thus, the embodiment of an after-treatment of the formed organosiloxane amine compounds obtained but not dried described above resides in subjecting the solid shaped in the form of spheres in the presence of at least the component water of the liquid phase last present in the preparation process as vapor or liquid to a temperature treatment for 1 hour to one week at temperatures of 50° to 300° C., preferably 100° to 200° C. The presence of an acidic, basic or metal-containing condensation catalyst can be advantageous.

The new, spherically formed organosiloxane amine polymers are characterized analogously to the systems described in DE-PS 31 20 214 in particular by the quantitative hydrolysis yields, the elementary analyses and the determination of the amine capacities.

In addition, the formed products exhibit a particle diameter of 0.01 to 3.0, preferably 0.1 to 2.0 mm, a specific surface of 0 to 1000, preferably 0 to 700 $m^2/g$ a specific pore volume of 0 to 6.0 ml/g and a bulk density of 500 to 100, preferably 100 to 800 g/l. The adjustable pore diameters are located in a range from 0 to over 1000 nm.

The chemical stability of the formed products is comparable to those of the unformed products, that is, a thermal stability in air is given up to approximately 275° C. and under an atmosphere of protective gas up to 400° C.

The applicability of the formed organosiloxane amine compounds extends basically to the same areas of technical applications typical for the so-called weakly basic ion exchangers based on organic polymer systems; however, it is not limited to them. A characteristic use of the formed, polymeric, secondary and tertiary amines, which constitutes further subject matter of the invention, is in the removal of acids from liquids and gases in accordance with known processing techniques.

If the formed organosiloxane amine compounds are to be used in water or an organic medium, it is recommended that the moistening with water or with the organic medium be preformed as gently as possible in order to avoid a mechanical damaging, especially a bursting, of the spheres. An especially gentle moistening method resides in gassing the material with air which is moist with water or charged with solvent, preferably saturated with solvent, or with an inert gas before transferring it into the particular liquid medium.

It can be necessary, when the formed organosiloxane amine has finally been brought into the appropriate medium, to remove traces of impure components from the preparation process. This can be performed by multiple rinsing and allowing the matter to stand in one of the liquid media named or by a brief heating. It can be advantageous in some instances to convert the organosiloxane amine into the corresponding ammonium form by means of reaction with a protonic acid.

Another application, which goes beyond the disclosure of DE-PS 31 20 214, is the use of the formed organosiloxane amines for the adsorptive binding of gaseous organic compounds, preferably organic solvents. The polarity of these organic compounds plays no essential part therein. For example, both short-chain alcohols as well as long-chain aliphatics or also aromatics are bound. Rather, the specific pore volume, the pore diameter and the surface qualities in particular are decisive for the adsorption capacity. These factors can be influenced on the one hand by the preparative and after-treatment methods of the invention and on the other hand also by the chemical composition, e.g. by the inclusion of hydrophobically acting groups of cross-linking agents in the aminosiloxane skeleton. The capacities of the formed aminosiloxanes of the invention for these organic compounds are partially up to over 100 % by weight. A regeneration is readily possible by elevating the temperature and/or by gassing with air or an inert gas. Analogously to the use as ion exchanger, the use of the formed aminosiloxanes as adsorbent can also take place in accordance with the static or the dynamic adsorption principle.

DETAILED DESCRIPTION OF EMBODIMENTS

The invention is explained in more detail in the following with reference made to examples of embodiments.

EXAMPLE 1

200 g of a tertiary aminosilane of the formula $N[(CH_2)_3Si(OC_2H_5)_3]_3$ were combined with 200 ml ethanol in a cylindrical 2-liter glass vessel with double jacket, KPG agitator with crescent-shaped agitator blade on top, reflux condenser and drop funnel. The solution was heated via the double jacket almost to reflux temperature and then compounded with 70 ml desalinated water. The mixture was agitated 15 min. more under reflux temperature and the heating was then halted. The solvent cooled down under slow agitation and gelation started after approximately 30 min. at an internal temperature of 55° C. Then 3 min. after the start of gelling, 400 ml xylene heated to 50° C. (industrial isomeric mixture) was added to the gel formed. The agitation was now set at 700 rpm and after a clear, viscous solution had been formed again, 400 ml desalinated 50° C. warm water were added. Two g polyethylene glycol (Mowiol 4-98) has been previously dissolved in the 400 ml water. The 2-phase system was now reheated and agitated further at 700 rpm. The formation of spheres started upon attainment of the reflux temperature. The mixture was agitated two hours further at reflux temperature, the flask contents then cooled off and the material, completely present in the form of spheres, filtered off from the liquid phase. The balls were subsequently transferred into a drying oven which was flushed with nitrogen and then dried 4 hours at 50° C., 4 hours at 100° C. and 16 hours at 150° C. The formed product, which contained recurring polymer units of the formula $N[(CH_2)_3SiO_{3/2}]_3$ was then transferred into a column, gassed 24 hours with moist air and subsequently fractionated into particle sizes. Of the total of 94.2 g, 92 % exhibited a particle size of 0.3 to 1.2 mm.

| | |
|---|---|
| Specific surface area: | 386 m²/g |
| Specific pore volume: | 0.68 ml/g |
| Bulk density: | 536 g/l |

EXAMPLE 2

400 g of a secondary aminosilane of the formula $HN[(CH_2)_3Si(OC_2H_5)_3]_2$, 400 ml ethanol and 450 ml octanol were combined in a cylindrical 3-liter glass vessel with double jacket, KPG agitator with crescent-shaped agitator blade on top, reflux condenser and drop funnel.

The solution was heated to reflux temperature and compounded in the boiling state with 60 ml desalinated water. The mixture was agitated 15 min. under reflux and then cooled down to 35° C. After 60 min. of slow agitation at 35° C., the gelation started. Immediately upon the start of gelation, 450 ml octanol were added to the mixture. After setting of the agitation speed at 500 rpm and after homogenization of the mixture, 1200 ml desalinated water were added. The mixture was subsequently heated to reflux temperature and agitated 1 hour at this temperature. It was cooled off and the liquid phase then removed by suction with a dip pipe from the reaction vessel. The remaining spheres were extracted twice for 10 min. each time with 800 ml ethanol and finally separated via a filter from the liquid phase and then dried under nitrogen 4 hours at 60° C., 4 hours at 100° C. and 16 hours at 150° C. 192 g highly symmetric, spherical product were obtained containing recurring polymer units of the formula $HN[(CH_2)_3SiO_{3/2}]_2$, 98 % of which exhibited a particle size of 0.3 to 1.4 mm.

| | |
|---|---|
| Specific surface area: | 506 m²/g |
| Specific pore volume: | 1.6 ml/g |
| Bulk density: | 512 g/l |

EXAMPLE 3

200.8 g $N[(CH_2)_3Si(OC_2H_5)_3]_3$, 199.2 g $Si(OC_2H_5)_4$ and 400 ml ethanol were combined in a cylindrical 3-liter glass vessel with double jacket, KPG agitator, reflux condenser and drop funnel. After the addition of 140 ml water, the solution was heated to reflux temperature and agitated 25 min. at this temperature. It was cooled down to 70° C. and slowly agitated further. After 30 min. agitation at 70° C., the charge gelled. Two minutes after the start of gelation, 750 ml of 60° C. warm toluene was added to the charge and the agitation set at 700 rpm. The mixture was heated and upon attainment of 70° C., 750 ml water were added. The mixture was subsequently agitated 45 min. under reflux, then cooled off and the suspension transferred onto a filter. The liquid phase was separated and the formed product transferred into a drying oven where it was dried under nitrogen 4 hours at 60° C., 4 hours at 100° C. and 16 hours at 120° C. 168 g spherical material was able to be obtained which was formed of recurring polymer units of the formula $N[(CH_2)SiO_{3/2}]_3 \cdot 3SiO_2$, over 95 % of which exhibited a particle size of 0.1 to 1.4 mm.

| | |
|---|---|
| Specific surface area: | 593 m²/g |
| Specific pore volume: | 0.82 ml/g |
| Bulk density: | 344 g/l |

EXAMPLE 4

161.9 g $N[(CH_2)_3Si(OC_2H_5)_3]_3$ together with 38.1 g $(CH_3)_2Si(OC_2H_5)_2$ and 70 ml water were combined in 200 ml ethanol. 109.6 g of formed product having recurring units of the formula $N[(CH_2)_3SiO_{3/2}]_3 \cdot (CH_3)_2SiO_{2/2}$ were obtained analogously to example 3 after 15 min. reflux, gelling at 70° C., addition of 320 ml xylene, 45 min. agitation at 500 rpm under reflux and 6 hours drying at 80° C. as well as 18 hours drying at 135° C. under an atmosphere of $N_2$.

| | |
|---|---|
| Distribution of particle size: | |
| 95% between 0.3 and 1.8mm | |
| Specific surface area: | 28 m²/g |
| Specific pore volume: | 0.2 ml/g |
| Bulk density: | 600 g/l |

EXAMPLE 5

200 g $(H_3C)N[(CH_2)_3Si(OC_2H_5)_3]_2$ and 80 ml water were agitated in a cylindrical 2-liter glass vessel analogously to example 3 for 15 min. at first at reflux temperature. After the mixture cooled off to 60° C., it gelled and 2 min. after the start of gelling 300 ml of warm (60° C.) hexanol were added at first and immediately after completion of homogenization 400 ml water were added. After 2 hours reflux time and a subsequent transfer of the entire batch into a steel autoclave, the formed material obtained was subjected under slow agitation to a temperature treatment at 130° C. for a period of 24 hours.

The material was then cooled down, the product present in the form of small spheres filtered from the aqueous phase, extracted three times with 300 ml ethanol each time and then dried 6 hours at 80° C., 6 hours at 100° C. and 12 hours at 150° C. under an atmosphere of protective gas. There was obtained 99.1 formed polymer product containing recurring units of the formula $(H_3C)N[(CH_2)_3SiO_{2/3}]_2$.

| Distribution of particle size: 95% between 0.3 and 2.0mm | |
| --- | --- |
| Specific surface area: | 446 m²/g |
| Specific pore volume: | 0.79 ml/g |
| Bulk density: | 435 g/l |

EXAMPLE 6

200 g $N[(CH_2)_3Si(OCH_3)_3]_3$, diluted with 200 ml methanol were compounded in the boiling state with 60 ml $H_2O$ and immediately cooled down to 50° C. The mixture gelled after 20 minutes and 500 ml of 50° C. warm decanol were added 30 sec. after the start of gelation. After the homogenization of the mixture had been completed, 97.8 g $Al(OC_4H_9)_3$ were added at first and after another minute 500 ml of 50° C. warm water were added. The agitation in the 2-liter agitated container was set at 500 rpm and the mixture then heated to reflux temperature. It was cooled off under reflux after 2 hours of agitation, and the liquid phase removed from the reactor. The formed material remaining was washed three times with 300 ml methanol each time, transferred into the drying oven and dried 6 hours at 80° C., 6 hours at 100 ° C. and 12 hours at 130° C. under an atmosphere of protective gas.

137.5 g formed, polymeric product formed of recurring monomeric units of the formula $N[(CH_2)_3SiO_{3/2}]_3 \cdot AlO_{3/2}$ were able to be obtained.

| Distribution of particle size: 95% between 0.1 and 1.8mm | |
| --- | --- |
| Specific surface area: | 547 m²/g |
| Specific pore volume: | 0.58 ml/g |
| Bulk density: | 410 g/l |

EXAMPLE 7

200 g $HN[(CH_2)_{10}Si(OCH_3)_3]_2$ together with 154.0 g $Si(OC_2H_5)_4$, 100 ml ethanol, 50 ml $H_2O$ and 150 ml octanol were combined in an agitated container and heated to reflux temperature. The mixture was refluxed (approximately 2 hours) until the start of gelation. 5 min. after the start of gelation, 300 ml of warm water (70° C.) in which 1 g Mowiol had been dissolved were added to the gel. The mixture was then agitated 4 hours further at 600 rpm under reflux, then cooled down. The entire reaction mixture was then transferred into an agitated autoclave and slowly agitated 24 hours at 150° C. After being filtered off and washed three times with 300 ml ethanol each time, the formed product was dried in a drying oven 6 hours at 80° C., 6 hours at 100° C. and 16 hours at 150° C. under an atmosphere of $N_2$. 188.6 g formed polymer were obtained formed of recurring units of the formula $HN[(CH_2)_{10}SiO_{3/2}]_2 \cdot 2SiO_2$.

| Distribution of particle size: 95% between 0.3–2.2mm | |
| --- | --- |
| Specific surface area: | <1 m²/g |
| Bulk density: | 680 g/l |

EXAMPLE 8 .

200 g

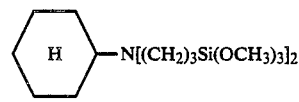

together with 200 ml ethanol and water were agitated in a cylindrical 2-liter glass vessel for 45 min. at first under reflux. After the mixture had cooled down to 75° C., the charge gelled and 1 min. after the start of gelation, 400 ml diisopropyl ether were added at first, then 134.2 g $Ti(OC_3H_7)_4$ and finally 500 ml water. The mixture was then agitated 2 hours at 600 rpm under reflux, and then cooled down. The solid present in the form of spheres was filtered off and dried 6 hours at 88° C., 6 hours at 100° C. and 12 hours at 130° C. under nitrogen. 171.0 g polymeric formed product were obtained formed of recurring units of the formula

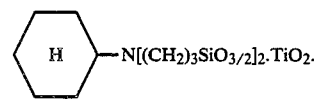

| Distribution of particle size: 95% between 0.3 and 1.8mm | |
| --- | --- |
| Specific surface area: | 472 m²/g |
| Specific pore volume: | 0.67 ml/g |
| Bulk density: | 482 g/l |

EXAMPLE 9 .

200 g

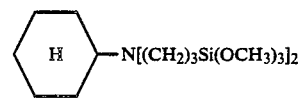

and 134.2 g $Ti(OC_3H_7)_4$ were precondensed under reflux temperature for 3 hours at first in 200 ml ethanol in which 2 g $NH_3$ and 2 g water had been dissolved. Then, 70 ml water were added, the mixture cooled down to 70° C. and the treatment continued in accordance with example 8. 172.1 g of polymer product according to example 8 were obtained.

| Distribution of particle size: 98% between 0.3 to 2.3mm | |
| --- | --- |
| Specific surface area: | 430 m²/g |
| Specific pore volume: | 0.69 ml/g |

| Distribution of particle size: 98% between 0.3 to 2.3mm | |
|---|---|
| Bulk density: | 493 g/l |

EXAMPLE 10

200

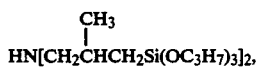

g
250 ml isopropanol and 60 ml water were agitated in a cylindrical 2-liter glass vessel 15 min. under reflux, then cooled to 70° C. and slowly agitated further until gelling started. Immediately after the start of gelation, 500 ml 2-ethylhexanol, then 285.3 g $Zr(OC_4H_9)_4$ and finally 500 ml water were added to the forming gel.

After the agitation had been set at 500 rpm, the mixture was agitated 2 hours under reflux, then cooled down and the solid present in the form of spheres filtered off, extracted three times with 400 ml isopropanol each time and then dried 6 hours at 80° C., 6 hours at 100° C. and 12 hours at 130° C. under nitrogen. 175.8 g polymeric formed product were obtained containing recurring units of the formula:

| Distribution of particle size: 95% between 0.1–1.2mm | |
|---|---|
| Specific surface area: | 487 m²/g |
| Specific pore volume: | 0.97 ml/g |
| Bulk density: | 485 g/l |

EXAMPLE 11

200 g
200 ml ethanol and 70 ml water were agitated in a cylindrical 2-liter glass vessel for 45 min. at first under reflux. After the mixture had cooled down to 70° C., the charge gelled and immediately after the start of gelation, 500 ml octanol, then 79.0 g $C_3H_7$-$Si(OC_2H_5)_3$ and finally 500 ml water were added. The mixture was then agitated 2 hours at 600 rpm under reflux, and then cooled down. The solid present in the form of spheres was filtered off, extracted three times with 400 ml ethanol each time and dried 6 hours at 80° C., 6 hours at 100° C. and 12 hours at 130° C. under nitrogen. 146.2 g polymeric formed product were obtained containing recurring units of the formula

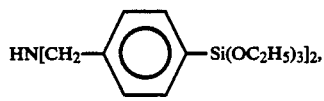

| Distribution of particle size: 95% between 0.3–1.2mm | |
|---|---|
| Specific surface area: | 45 m²/g |
| Specific pore volume: | 0.48 ml/g |

| Distribution of particle size: 95% between 0.3–1.2mm | |
|---|---|
| Bulk density: | 570 g/l |

EXAMPLE 12

Starting with 161.9 g $N[(CH_2)_3Si(OC_2H_5)_3]_3$, 19.05 g $(CH_3)_2Si(OC_2H_5)_2$ and 26.8 g $Si(OC_2H_5)_4$, 96.1 polymeric product were obtained analogously to example 4 formed of recurring units of the formula:

$$N[(CH_2)_3SiO_{3/2}]_3 \cdot 0.5(CH_3)_2SiO_{2/2} \cdot 0.5SiO_2.$$

| Distribution of particle size: 95% between 0.3 and 1.6mm | |
|---|---|
| Specific surface area: | 256 m²/g |
| Specific pore volume: | 0.78 ml/g |
| Bulk density: | 485 g/l |

EXAMPLE 13

Starting with 200 g $N[(CH_2)_3Si(OCH_3)_3]_3$, 48.9 g $Al(OC_4H_9)_3$, 41.4 g $Si(OC_2H_5)_4$, 148.9 g polymeric product were obtained analogously to example 6 containing recurring units of the formula:

$$N[(CH_2)_3SiO_{3/2}]_3 \cdot 0.5AlO_{3/2} \cdot 0.5SiO_2.$$

| Distribution of particle size: 95% between 0.1 and 1.6mm | |
|---|---|
| Specific surface area: | 585 m²/g |
| Specific pore volume: | 0.86 ml/g |
| Bulk density: | 425 g/l |

EXAMPLE 14

20 g (dry weight) of the organosiloxane amine of the formula $N[(CH_2)_3SiO_{3/2}]_3$ prepared according to example 1 and present in the form of spheres of particle size 0.3–1.2 mm were first slurried in water in a beaker glass after the moistening performed according to example 1 and then transferred after a brief residence time into a column with an inner diameter of 15 mm. The column was first charged with 100 ml desalinated water and then within one-half hour with 100 ml aqueous ln HCl solution. After the column had been washed with 150 ml $H_2O$, the flow-through combined with the wash solution was filtered with ln NaOH solution. It turned out as a result that approximately 67 % of the amount of HCl originally added had been bound by the polymeric amine, which corresponds to an approximately 100 % saturation of the theoretical capacity present.

A regeneration of the aminosiloxane to over 98 % was again possible by means of a subsequent reaction with 200 ml 2 % $NH_3$ solution.

EXAMPLE 15

10 g of a formed, polymeric organosiloxane amine compound of the formula $N[(CH_2)_3SiO_{3/2}]_3 \cdot SiO_2$ prepared according to example 5 using octanol instead of hexanol and with the following data:

| Particle size | 0.1 to 1.2 mm |
|---|---|
| Specific surface area | 695 m/g |

| Total pore volume | 3.63 ml/g | were filled into each of three glass columns with an inner diameter of 15 mm. Air was blown through these columns which air had previously been saturated in each instance with isopropanol or xylene or hexane. The particular weight increase in each instance was measured after 36 hours. It was determined thereby that the column which had been charged with isopropanol exhibited a weight increase of 120 % and the columns which had been charged with xylene and n-hexane each exhibited a weight increase of 100 % (in relation to the 10 g polysiloxane added). Warm air at 60° C. was subsequently blown through the columns. It was determined after 8 hours that the bound solvent had been completely given off again in each instance.

Further variations and modifications will be apparent to those skilled in the art from the foregoing and are intended to be encompassed by the appended claims.

WE CLAIM:

1. A spherically formed, polymeric, tertiary or secondary organosiloxane amine compound containing recurring units of the formula:

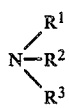
(I)

in which $R^1$ and $R^2$ are identical or different and represent a group of the formula:

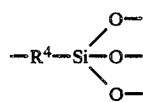
(II)

in which formulae the nitrogen atoms in (I) are connected to the silicon atoms in (II) via the $R^4$ groups and $R^4$ represents an alkylene group with 1 to 10 C atoms, a cycloalkylene group with 5 to 8 C atoms or a unit of the general formula:

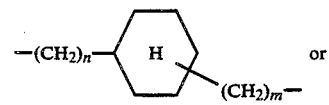

in which n is a number from 1 to 6 and indicates the number of methylene groups in nitrogen position and m is a number from 0 to 6
and the free valences of the oxygen atoms bound to the silicon atom are attached either to
(a) silicon atoms of other groups of formula (II) or to
(b) metal atoms of one or more of the cross-linking binding links

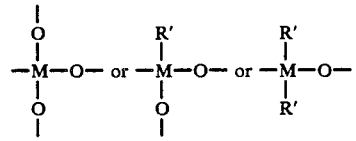

or

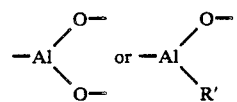

or a combination of (a) and (b)
in which M is a silicon, titanium or zirconium atom and R' a linear or branched alkyl group with 1 to 5 C atoms and the ratio of the silicon atoms of the groups of general formula (II) to the metal atoms in the binding links is 1:0 to 1:10
and in which $R^3$ is equal to $R^1$ or $R^2$ or hydrogen,
or a linear or branched alkyl of 1 to 10 C atoms, a cycloalkyl of 5 to 8 C atoms or is benzyl, wherein the said compound is in the form of macroscopically spherical particles with a diameter of 0.01 to 3.0 mm, a specific surface area of up to 1000 m²/g, a specific pore volume of 0 to 6.0 ml/g as well as by a bulk density of 50 to 1000 g/l.

2. The formed, polymeric organosiloxane amine compound according to claim 1, wherein $R^4$ is a linear or branched alkylene.

3. The formed, polymeric organosiloxane amine compound according to claim 1, formed of the recurring units:

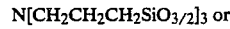
N[CH₂CH₂CH₂SiO₃/₂]₃ or

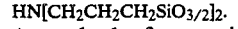
HN[CH₂CH₂CH₂SiO₃/₂]₂.

4. A method of preparing the spherically formed, polymeric organosiloxane amine compounds according to claim 1, comprising dissolving a secondary or a tertiary aminosilane of the formula:

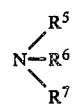
(III)

in which $R^5$ and $R^6$ are identical or different and represent a group of the formula:

-R⁴ - Si(OR⁸)₃ Tm  (IV)

$R^4$ has the same meaning as in formula (II),
$R^8$ is a linear or branched alkyl group with 1 to 5 C atoms and
$R^7$ is equal to $R^5$ and $R^6$ or hydrogen, a linear or branched alkyl group with 1 to 10 C atoms, a cycloalkyl group consisting of 5 to 8 C atoms or to the benzyl group, in a solvent capable of dissolving said aminosilane, and which is miscible in water but dissolves aminoorganosilane to form a solution,
adding an amount of water which is sufficient at least for the complete hydrolysis and condensation of said aminosilane to the solution under agitation, to form a reaction mixture, allowing the reaction mixture to gel under further agitation at a temperature in a range from room temperature to 200° C., and compounding at the start of gelation or up to one hour thereafter with 10 to 2000% by weight in relation to the total amount of aminoorganosilane (III) and any cross-linking agents, of a solvent which is non-soluble in water but which dissolves the reaction mixture and homogenizing said reaction mixture to form a viscous homogenizate, adding water to the viscous homogenizate immediately or over a period of time up to one hour in the amount of 10 to 2000% by weight, in relation to the total amount of aminoorganosilane and any cross-linking agents, dispersing the organic phase, which now contains siloxane, in the liquid two-phase system formed thereby, separating the solid which forms thereby as spheres after a reaction time sufficient therefor at room temperature to 200° C. from the liquid phase.

5. The method according to claim 4, wherein there is added one or more cross-linking agents of the general formula:

$$M(OR)_{2-4}R'_{0-2} \text{ or } Al(OR)_{2-3}R'_{0-1}$$

in which M is a silicon, titanium or zirconium atom, R' a linear or branched alkyl group with 1 to 5 C atoms and the ratio of silicon atoms of the groups of the general formula (IV) to the metal atoms in the cross-linking agents is 1:0 to 1:10.

6. The method according to claim 4, wherein water is added in the amount of 50 to 500 % by weight.

7. The method according to claim 4, wherein the solid is extracted, dried at room temperature to 250° C.

8. The method according to claim 7, wherein the solid is dried under protective gas or vacuum.

9. The method according to claim 8, wherein the solid is heated 1 to 100 hours at a temperature of 150 to 300° C.

10. The method according to claim 9, wherein the solid is classified into different particle size fractions.

11. The method according to claim 4, wherein methanol, ethanol, n- and i-propanol, n- and i-butanol or n-pentanol is used as solvent in the hydrolysis.

12. The method according to claim 4, wherein the hydrolysis is carried out with excess water.

13. The method according to claim 4, wherein a linear or branched alcohol with 4 to 12 C atoms, toluene or o-, m-, p-xylene is added individually or in a mixture to the reaction mixture which has gelled or started to gel.

14. The method according to claim 4, wherein a part or the entire amount of the largely non-water-soluble solvent to be added at or after the start of gelation is added in the hydrolysis stage along with the solvent used there.

15. The method according to claim 4, wherein gelation and separating are carried out at normal pressure or a superpressure which corresponds to the sum of the partial pressures of the components of the reaction mixture at the particular temperature used.

16. The method according to claim 4, wherein the aminoorganosilane is separately gelled, homogenized with the largely non-water-soluble solvent to form a homogenizate and a cross-linking agent is added to said homogenizate in order to obtain cross-linked organopolysiloxane amine compounds.

17. The method according to claim 4, wherein the aminoorganosilane and a cross-linking agent are precondensed 5 minutes to 24 hours in the presence of 1 to 30 mole % of the amount of water stoichiometrically required for complete hydrolysis.

18. The method according to claim 17, wherein a condensation catalyst is also added.

19. The method for the aftertreatment of a formed organosiloxane compound obtained according to a method comprising dissolving a secondary or a tertiary aminosilane of the formula:

$$N\begin{matrix}-R^5\\-R^6\\-R^7\end{matrix} \quad (III)$$

in which $R^5$ and $R^6$ are identical or different and represent a group of the formula:

$$-R^4 - Si(OR^8)_3 \text{ TM (IV)}$$

$R^8$ is a linear or branched alkyl group with 1 to 5 C atoms and $R^7$ is equal to $R^5$ and $R^6$ or hydrogen, a linear or branched alkyl group with 1 to 10 C atoms, a cycloalkyl group consisting of 5 to 8 C atoms or to the benzyl group, in a solvent capable of dissolving said aminosilane, and which is miscible in water but dissolves aminoorganosilane to form a solution, adding an amount of water which is sufficient at least for the complete hydrolysis and condensation of said aminosilane to the solution under agitation, to form a reaction mixture, allowing the reaction mixture to gel under further agitation at a temperature in a range from room temperature to 200° C., and compounding at the start of gelation or up to one hour thereafter with 10 to 2000% by weight in relation to the total amount of aminoorganosilane (III) and any cross-linking agents, of a solvent which is non-soluble in water but which dissolves the reaction mixture and homogenizing said reaction mixture to form a viscous homogenizate, adding water to the viscous homogenizate immediately or over a period of time up to one hour in the amount of 10 to 2000% by weight, in relation to the total amount of aminoorganosilane and any cross-linking agents, dispersing the organic phase, which now contains siloxane, in the liquid two-phase system formed thereby, separating the solid which forms thereby as spheres after a reaction time sufficient therefor at room temperature to 200° C. from the liquid phase, further comprising in that the solid shaped in the form of spheres is subjected in the presence of at least the component water of the liquid phase as vapor or liquid to a temperature treatment for one hour to one week at temperatures from 50 to 300° C.

20. A formed, polymeric, tertiary or secondary amine obtained according to claim 4.

21. A formed, polymeric, tertiary or secondary amine obtained according to claim 19.

* * * * *